Nov. 18, 1930.                F. BATTER                    1,781,913
                        HEAT EXCHANGE APPARATUS
                       Filed July 14, 1925        6 Sheets-Sheet 1

Fig. 1

Inventor
Frank Batter
By his Attorney

Nov. 18, 1930. F. BATTER 1,781,913
HEAT EXCHANGE APPARATUS
Filed July 14, 1925 6 Sheets-Sheet 4

Nov. 18, 1930.   F. BATTER   1,781,913
HEAT EXCHANGE APPARATUS
Filed July 14, 1925   6 Sheets-Sheet 5

Inventor
Frank Batter
By his
Attorney

Nov. 18, 1930.   F. BATTER   1,781,913
HEAT EXCHANGE APPARATUS
Filed July 14 1925   6 Sheets-Sheet 6

Inventor
Frank Batter
By [signature]
Attorney

Patented Nov. 18, 1930

1,781,913

UNITED STATES PATENT OFFICE

FRANK BATTER, OF LINNTON, OREGON

HEAT-EXCHANGE APPARATUS

Application filed July 14, 1925. Serial No. 43,544.

This patent application is related to United States patents, issued to me, as follows:

November 17, 1908, No. 904,172, an apparatus for therapeutic treatment of the air of living rooms; one issued December 5, 1916, No. 1,206,977, a process of controlling the humidity of the atmosphere; one issued August 28, 1923, No. 1,466,652, a portable mountain air sanitarium; one issued August 28, 1923, No. 1,466,653, on a timing apparatus for mountain air sanitariums; and one issued February 10, 1925, No. 1,526,043, for toilet fixture for mountain air sanitarium, and one pending application filed in the United States Patent Office, on or about July 25, 1923, Serial No. 653,744, for a therapeutic process and apparatus for controlling the humidity, which is now pending in the United States Patent Office.

My invention relates to apparatus and means for treating dense moist air, which provides atmospheric conditions, after the air has been treated therein, closely resembling those in high and dry altitudes.

The purpose of my invention is to provide an apparatus for supplying to hospitals, sanitariums and the like located in districts where dense moist atmospheric conditions prevail, dry and rarified atmosphere, such as is experienced in certain mountainous regions.

With these and incidental objects in view, the invention consists in certain novel features of construction and combination of parts, the essential elements of which are set forth in the appended claims, and to a preferred form of embodiment of which is herein after shown with reference to the drawings which accompany and form a part of this specification:

In the drawings:—

Like reference characters refer to like parts throughout the several views.

The invention consists of a cylinder 1, having reciprocated therein a piston 2, by attendant power means. The piston has a ring 3, disposed about the outer periphery thereof, made of felt or other suitable material. It may be found desirable to support the piston by roller supports 2ª, so arranged as to reduce friction, as far as possible from the ring disposed around the piston. It will be remembered that in devices of this character, it is necessary to handle a measured amount of air in substantial volume, in periodic movements so that the same may be progressed in each step of its advancement, for a measured amount of time. The piston 2, is of a substantial area and slow acting in its movements. The piston ring 3, disposed about its outer periphery is adapted to contact with the inside wall of the cylinder, the said piston having power means for reciprocating the same. An inlet 4, conducts normal air into the cylinder having an inlet valve 5, disposed on the inner end of the same so that in the forward movement of the piston, air is drawn within the space created as the piston advances and on the back stroke of the same, valves 6 and 7, disposed on the forward end of the piston are opened due to the return stroke of the piston. Inlet valve 5, is closed so that the air is admitted through the piston into the chamber on the opposite side of the piston. A diaphragm wall 8, is disposed on the forward end of the cylinder 1, having valves 9, 10, and 11, disposed on the outer side of the same so that on the forward movement of the piston, the air within the cylinder is forced through the valves 9, 10, and 11, into the passageway 12, which leads into a cone shaped member or diffuser chamber 13, adapted to diffuse the air thus circulated into a warming chamber which has radiant warning means, as electric lights 14, disposed therein and in such number as conditions may require, and in spaced relationship with each other, so that the air circulating therethrough will come into intimate contact with and pass around the bulbs located within the warming chamber. This is desired where the incoming air is below the temperature of seventy degrees Fahrenheit. I prefer that these bulbs be made of material, as fused quartz, or of such other material as will permit the greatest number of light rays to pass therethrough. The passageway 12, terminates in the diffusing head disposed above the warming chamber and there is also a concentrator head disposed therebelow, leading into the passageway 15. The passageways and diffusing chambers are to be sufficient in magnitude to permit of the free passage of the air therethrough, without undue frictional resistance. The passageway 15 leads to the outer chamber 16, at one end of the condenser $A^{16}$. The condenser $A^{16}$ is here shown to be an enclosed boxlike structure or housing. A longitudinal and transverse L-shaped wall $a$ is disposed within the structure and spaced from the side and end walls $b$ and $c$ to form an angular bypass $A^{18}$. The L-shaped wall $a$ of the bypass and the wall $d$ of the condenser form an enclosure which constitutes the condenser proper. This enclosure is divided into a series of parallel passageways or condensing chambers $A^{17}$, through which the air to be cooled is directed to flow. Each of these passageways or compartments has cooling means disposed therein, which will be described later. The outer chamber 16 is separated from the rest of the condenser by a perforated wall 17 having a series of holes or perforations 18 therein. The warmed air from the outer chamber 16, may pass directly into the condensing chambers $A^{17}$, to eliminate the moisture content therefrom in advance of the rarification of the same, or condensation can be eliminated by causing the air to flow directly through the bypass $A^{18}$. Or the air may be caused to flow partially through the condensers and partially through bypass. The damper or valve 16A is so arranged that it may close all or a portion of the entrances into the condensing chambers $A^{17}$. The damper 16A is slidable across the openings or entrances into the several condensing chambers, and is operated by means of a wheel 16F mounted to the vertically mounted shaft $16^e$, also, on the shaft $16^e$ is mounted the pinion $16^d$, which engages the rack $16^c$ of the slide or damper 16A.

The opening to the bypass chamber $A^{18}$ is normally closed by a slidable closure or valve or damper $16^i$, which is of sufficient width to cover or close the entrance to the bypass. The closure $16^i$ is normally positioned across the mouth of the bypass by means of the springs $16^j$ positioned exteriorly of the condenser, and which tend to force the damper inwardly across the opening into the bypass. At the top and bottom of the inner edge of the damper $16^i$ are formed inwardly extending lugs or projections $16^h$ and $16^g$, which are positioned in parallel alignment to the damper $16^A$, so that as the damper $16^A$ is moved inwardly to close the openings to the condensing chambers $A^{17}$, the inner edge of the damper $16^A$ will engage the lugs $16^h$ and $16^g$, which will force the closure $16^i$ to move outwardly, and this will uncover the openings to, and permit the free passage of air from the outer chamber 16 to the bypass chamber $A^{18}$.

In the condensing chambers $A^{17}$ are tubes 19, vertically mounted therein, through which a cooling medium may be circulated. These tubes are preferably made of glass, and upon which means are provided to periodically wipe the condensed moisture therefrom, to collect the same upon the sloping surface 20, from where the liquid drains into the tank 21 through the piping connections 22, which will permit the quantity of water condensed from the air passed through the condensing chamber, to be measured.

The number of strokes per minute of the piston and the volume of the cylinder will determine the amount of air being circulated in the given time. The number of grains of water carried in suspension within the air may be determined by commercial apparatus now available for such purposes. The amount of condensation precipitated may be determined at stated intervals and the same be registered at the point of use, so that the true condition of the air being supplied may be shown and the amount of water eliminated be measured by my apparatus.

The cooling medium of any well known material, as sulphur dioxide, which I have found to give the best result, is best suited for the purposes herein outlined, is circulated by the pump 23, through the piping 24, into the tank 25, through which the cooling medium is circulated to the tubes in the condensing chambers, and back to the circulating pump 23. This refrigerating mechanism may be of any make suited to the work herein outlined. The glass tubes have disposed upon either ends of the same U shaped connections 26, with suitable packing glands adapted to maintain a tight connection between the glass tubes and the connections attaching the same to the adjacent tubes. Corrugated walls 27, are parallely disposed between the alternate rows of tubes to provide the passageways or chambers $A^{17}$ through which the air passes. The object is to cause the air to remain quiescent in the condensing chamber and to come in intimate contact with the cooling tubes for a period of time equal to the period of one cycle of operation of the piston within the cylinder. The piston being of the very slow acting type will then empty the condensing chamber of the cooled condensed air within the same and will supply therein a new charge of air.

The warmed air, with its moisture content held in suspension therein flows into the condensing chambers, and when it contacts with the condensing tubes is in a high state of temperature and one dew point is reached and certain moisture is deposited upon the cooled tubes, as the same flows through the condensing chambers the high temperature decreases and different dew points will be encountered so that in the outlet end of the condensing chamber much of the moisture content of the air will have been condensed and the same be deposited upon the wall surfaces of the condensing chambers. If found desirable different temperatures may be maintained within different condensing tubes, to further facilitate the condensing action.

The deposit of the condensed material upon the outer surfaces of the glass tubes will in effect have a tendency to cleanse the air of foreign substances held in suspension therein because of the intimate contact of the material with the surfaces of the tubes, which tends to wash or cleanse the same.

Figure 1:
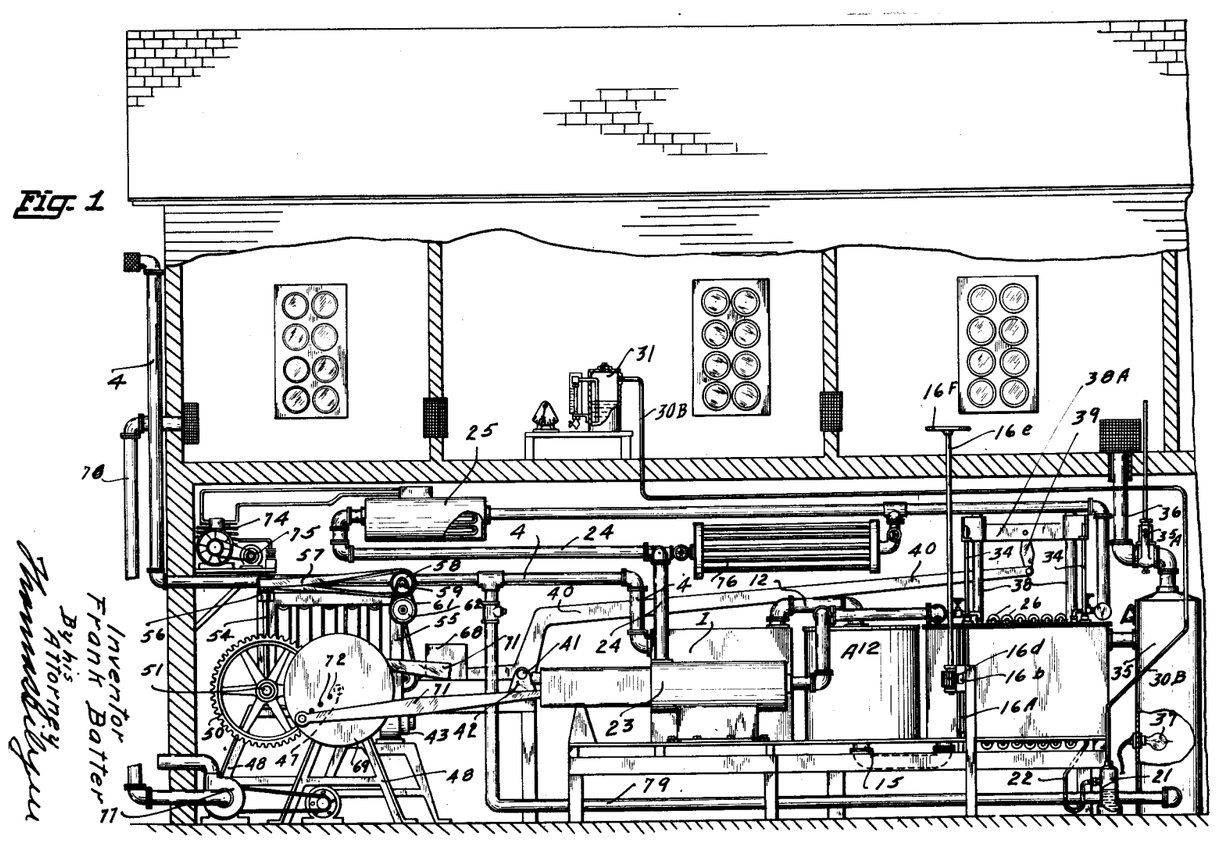
Fig. 1 is a side elevation, of a preferred embodiment of my apparatus, shown as located within the lower story of a building, with the one side wall of the building removed to show the application of the same and the relation of the units composing the same.
Figures 2, 8:
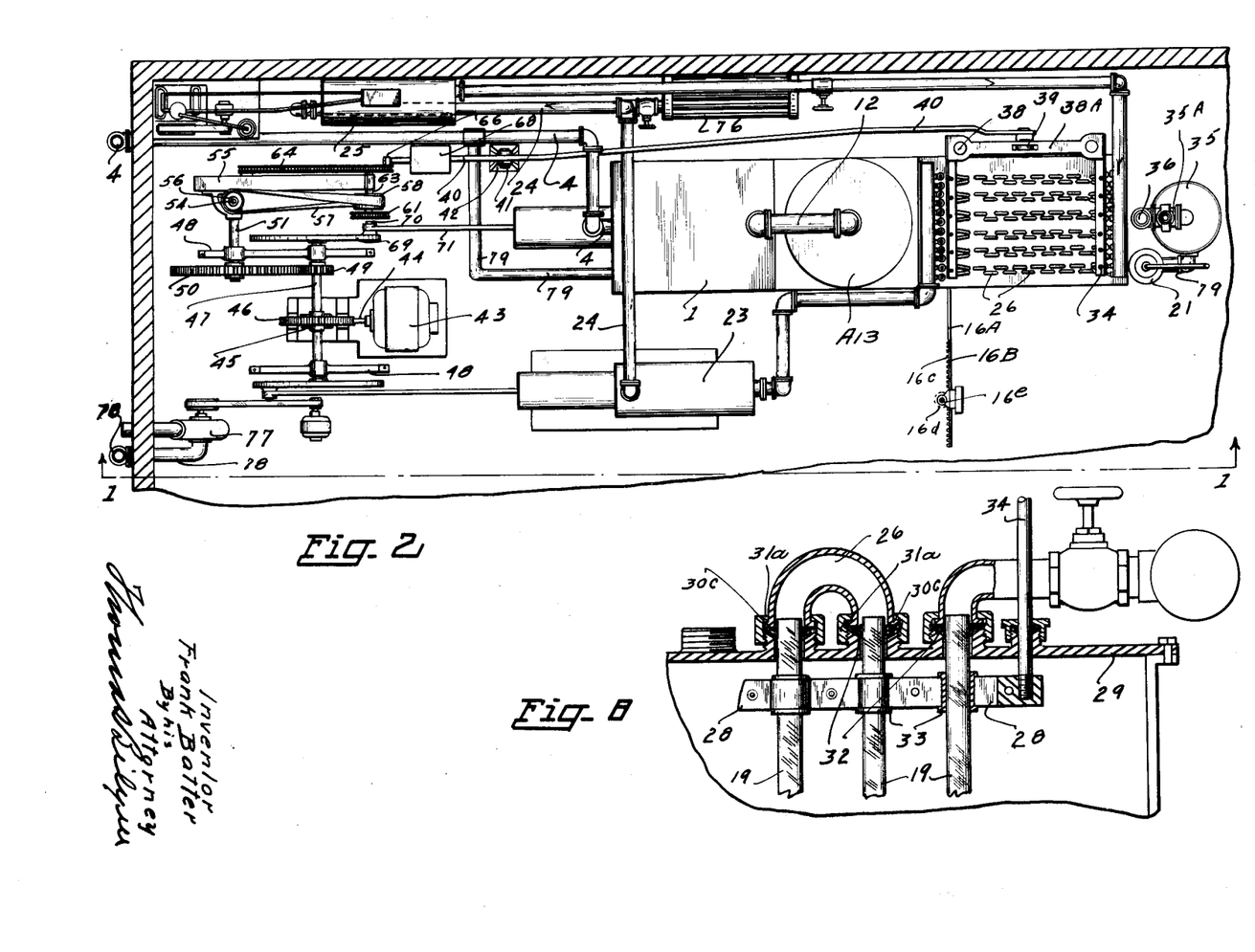
Fig. 2 is a plan view of the mechanism shown in Fig. 1.
Fig. 8 is a detailed side elevation, partially in section, of the automatic means provided for the removal of the condensed moisture within the condensing chamber.
Figure 3:
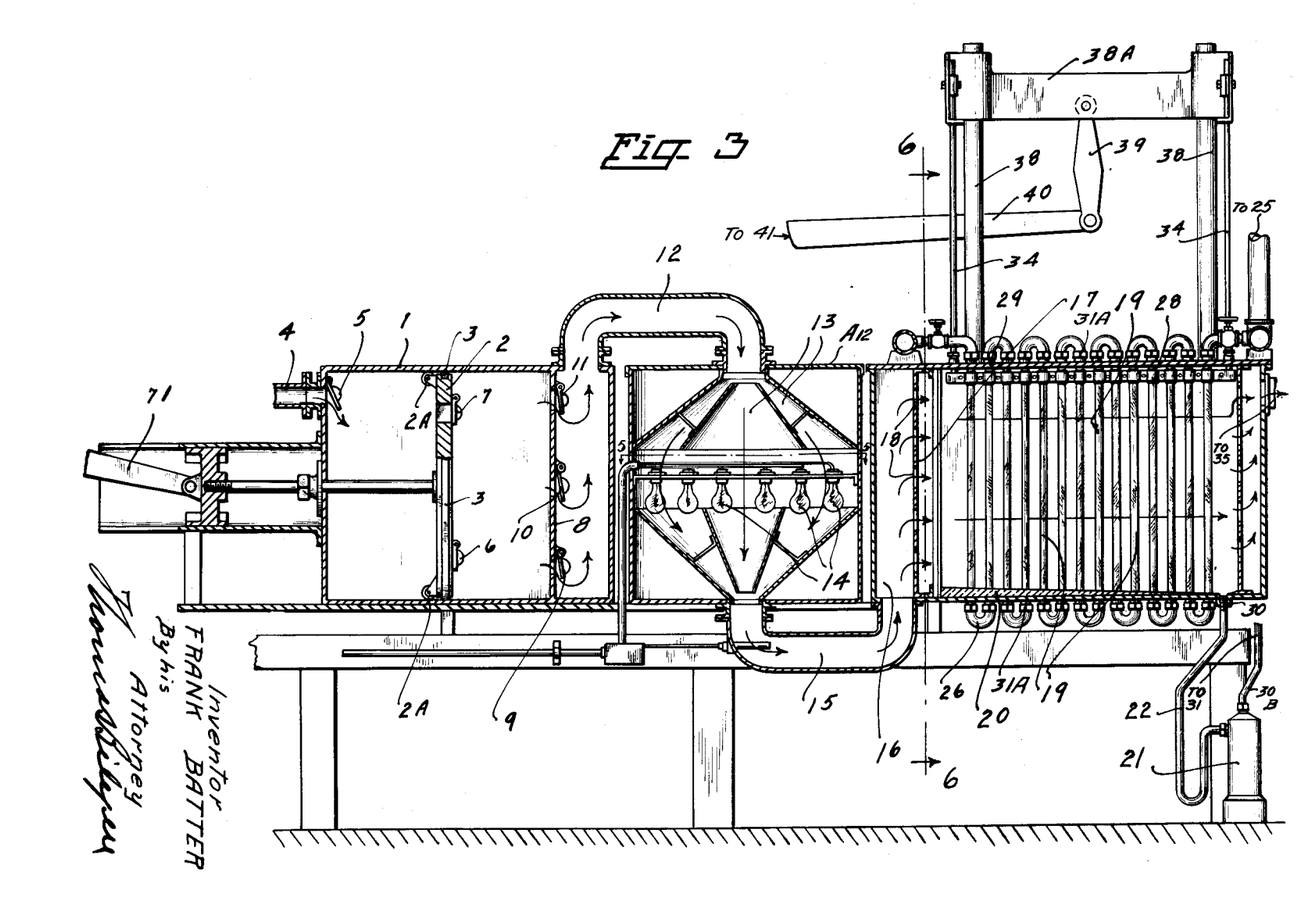
Fig. 3 is a transverse sectional view, through the circulating chamber, the warming chamber, and the condensing chamber, showing the connecting passageways leading from one to the other.
Figures 4, 5:
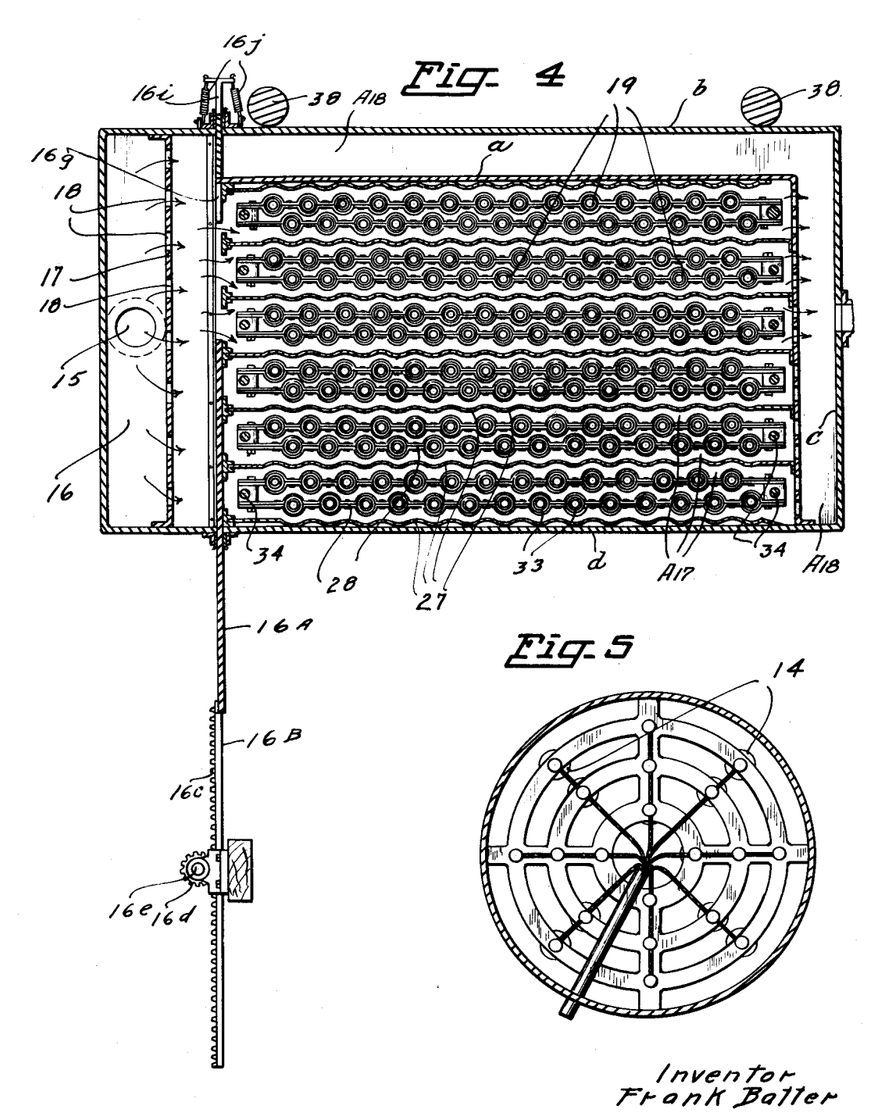
Fig. 4 is a detailed plan view, of the condensing chamber, taken on line 4—4 of Fig. 6, looking in the direction indicated.
Fig. 5 is a cross sectional view, taken on line 5—5 of Fig. 3, looking in the direction indicated, and is made to illustrate a preferred form of embodiment of the warming chamber, wherein I prefer to use radiant rays, as through fused quartz, as the warming medium.
Figure 6:
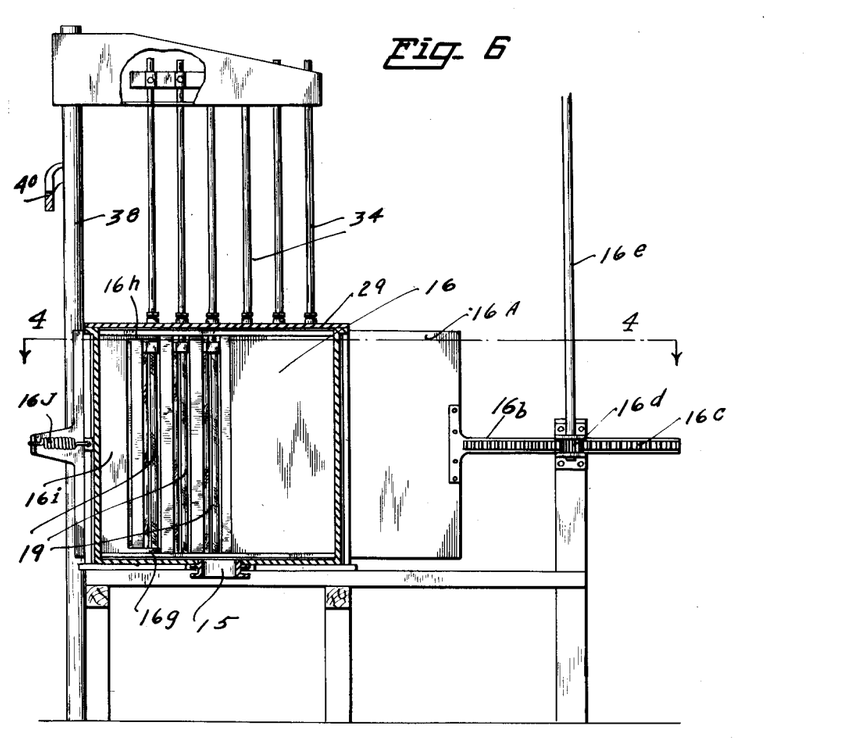
Fig. 6 is a side elevation, partially in section of the condensing chamber, taken on line 6—6 of Fig. 3, looking in the direction indicated.
Figure 7:
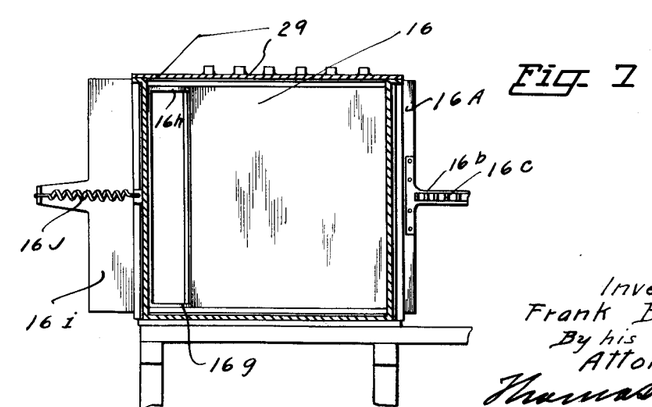
Fig. 7 is a sectional view of the condensing chamber, made particularly to illustrate the means provided therein for closing the passageway leading through the condensing chamber, requiring the air to pass through a by-pass into the receiving tank, without passing through the condensing chamber.

Periodically, and at definitely stated intervals, the condensed deposited material upon the tubes is removed by a forcing downward of a bar 28, adapted to contact with the outer surface of the tubes within the condensing chamber. The bar 28, is provided with wiping glands which are made of suitable material, as rubber. The material condensed from contact with the tubing will be deposited upon the bottom of the condensing chamber, as shown at 20, which connects to a central outlet 30, having attached thereto the tube 22, leading to the receiving tank 21. A piping connection is made with the tank 21, as shown at $30^b$, which leads to a central calibrated transparent tank 31, adapted to register either directly or indirectly, the quantity of liquid being removed from the condensing chamber. The piping system is best shown in Fig. 1, connecting the two tanks and also the relative locations of the tanks.

The condensing tubes 19, are made of uniform diameter and length, and pass through the tube plate 29, disposed above the condensing chambers and forms the outer upper wall of the same. The U shaped connections 26, have flanges $30^e$, on their ends and are adapted to engage about the upper ends of the condensing tubes 19, with a substantial clearance thereabout, so that the tubes may not be damaged by a substantially tight connection that is made therewith through the medium of the locking nut $31^a$, adapted to maintain a packing material 32, about the outer, upper and lower ends of the tubes to form a tight working joint thereabout. The means provided for removing the condensed material from the outer surface of the condensing tubes, consists primarily of a series of bars 28, having soft flexible wiping glands 33, secured thereto and about the outer surface of the tubes. I have found that best results are obtained where a soft rubber bushing 33, is used. Means are provided for imparting a reciprocating movement to the bar 28, through the action of the shaft 34, secured to either end of the bar 28, said bar being intermittingly actuated by means hereinafter to be described. I have found that as fairly low temperatures are maintained within the condensing chamber that the air in its passage therethrough will go through varying degrees of temperature. If starting at about eighty degrees Fahrenheit above zero, as the same is progressed through the condensing chamber, the same will be cooled by contacting with the surfaces of the tubes which are maintained in the cold state. The air being treated and circulated may pass through the by-pass heretofore mentioned or be discharged from the condensing chamber directly into the receiving tank 35. The receiving tank 35 must be of substantial volume and have disposed thereon a valve adapted to release the air from the tank in a relatively uniform flow from the tank and deliver the same through suitable piping means as 36, into the living room or other point of use. In order to maintain the air in a live, active condition, and to prevent the same from becoming dead or inactive. I have found that desirable results are obtained by the placing of one or more electric bulbs 37, within the tank adapted to deliver heat and light into the tank; best results being obtained where the walls of the bulb are formed from fused quartz or other material adapted to pass the greatest number of rays of light.

Figure 9:
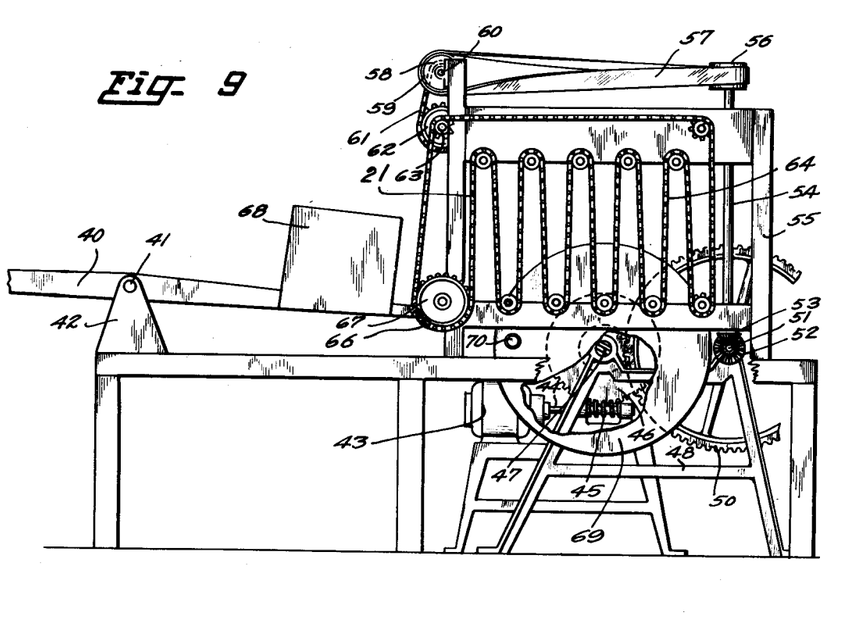
Fig. 9 is an enlarged perspective view of two units of the chain adapted to the actuating of the means provided for the removal of the moisture deposited upon the outer surfaces of the cooling tubes within the condensing chamber.
Figure 10:
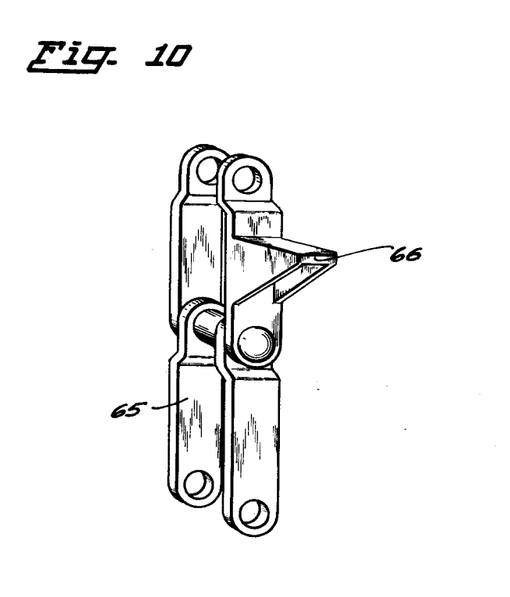
Fig. 10 is an enlarged detailed, sectional view, of the mechanism provided for the removal of the condensed material upon the cooling tubes within the condensing chamber.

The shafts 34, have a cross yoke 38A, adaptable to slidable engagement with the guideway shafts 38. A link 39 is secured in pivotal relationship to the yoke 38 and has an operating lever 40, secured to the lower end thereof and adapted to impart an up and down movement to the yoke. The operating lever is pivoted about a journal 41, secured to the pillow block 42. A motor 43, or other suitable prime mover, having a main shaft 44, to the outer end of which is secured a screw 45, said screw is adapted to engagement with the worm wheel 46, secured to the shaft 47, which is supported within the frame structure 48. The pinion 49 is also secured to the shaft 47, and is adapted to coact with the gear 50, which is secured to the shaft 51. A bevel gear 52, is also secured to shaft 51, and adapted to engagement with the bevel gear 53, which is secured to the shaft 54. The shaft 54 is journaled in proper and suitable bearing about the frame structure 55, and has disposed upon the upper end thereof a pulley 56, about which the cross belt 57, is driven the same transmitting rotation to the pulley 58, through the pulley 59, mounted upon the shaft 60, and a second belt 61, drives a pulley 62, secured to the shaft 63. A chain of the link type, as shown by 64 in Fig. 10, is driven about a train of sprockets. One or more of the links are provided with outstanding lugs or projections 66, the purpose of which will be hereafter explained. The arrangement of the chain and the train of sprockets is fully shown in Fig. 9, and it will be seen that the free end of the lever system 40 is in the line of movement of the lug 66 when the chain is moved clock-wise. The free end of the lever 40 is maintained in a lowered position by a counter weight 68. As the chain passes about the sprockets the lug 66 engages the free end of the lever 40 and raises the same to a point where the lug slips from the end of the lever which allows the lever 40 to return to its former lowered position. It will be seen that every time the free end of the lever 40 is raised, the opposite end, to which is connected the wiping apparatus for wiping the condensed moisture from the glass tubes, is lowered.

The motor 43, is the prime mover for operating the piston within the cylinder to cause the circulation of air through my device, as well as for operating the trip mechanism for removing the condensed material from the surfaces of the condensing tubes and a pitman disk 69, is also secured to the shaft 47, having a wrist pin 70, secured thereto to which the pitman rod 71, connects upon its one end to the wrist pin and upon the other to the piston within the cylinder, adapted to cause a circulation of air through my device. In order to regulate the length of the stroke of the piston and therefore to regulate the volume of air to be passed therethrough upon each alternate stroke, I have arranged a series of holes 72, upon the pitman disk into which the wrist pin may be changed as desired so that the length of stroke of the piston within the cylinder may be regulated.

A refrigerating machine 74, having a suitable power unit 75, for operating the same is conveniently located for cooling the medium to be circulated through the tubes in the condensing chamber.

Where the temperature within the working room is desired to be lowered the same is accomplished by the refrigerated coils 76, through which the cooling medium may be circulated, the same being exposed to the air within the room. As I have stated before, my device is primarily intended to supply in a room or a hospital ward, air similar to dry mountain air, and it is particularly useful in a low altitude under moist conditions. In order that the proper effect may be had with my apparatus, the same must be used with a room receiving its air supply through my moisture control apparatus. It will be readily seen that inasmuch as the air passing through my device is not under any substantial pressure that some means must be provided for withdrawing the used air from the room and drawing the fresh air from the storage tank, and this is accomplished by means of the mechanical exhauster 77 which maintains a constant circulation of fresh treated air through the room or rooms, and, at the same time, may be used for the purpose of rarifying the air. The exhauster 77 is here shown connected by the intake pipe 78 (partially broken away), to a room and the exhaust pipe leading directly to the outer air. In the event that untreated normal air is required to be delivered for any purpose into the receiving tank, the same may be accomplished by the admission of the normal air into the tank through the piping 79, and as the exhauster is operated the pressure created below the normal pressure will cause the flow of the normal air into the tank through the piping 79.

Since the condensing chamber is divided by partitions and the cooling medium is pumped through the tubes placed therein, the cooling medium will be cooler at the entrance to the condensing tubes than at the outlet therefrom due to the contact with the warmed air being passed through the condensing chamber. I have found that best results are obtained where the cooling medium enters the condensing chamber at the outlet end of the condensing chamber for the air being passed therethrough. Arranged in this way a wider range of dew points will occur in the condensing chamber.

While the form of mechanism herein shown and described is admirably adapted to fulfill the objects primarily stated, it is to be understood that it is not intended to confine the invention to the one form of embodiment herein shown and described, as it is susceptible of embodiment in various forms all coming within the scope of the claims which follow.

What I claim is:—

1. In a device of the class described, a warming chamber having openings disposed through its top and bottom, conical shaped baffles attached within the chamber and in spaced relation, the upper baffle having its top side downwardly sloping and having an opening at the apex of the cone in registrable alignment with the top opening in the chamber, the lower baffle having its top side upwardly sloping and having an opening at the apex of the cone in registrable alignment with the bottom opening in the chamber, secondary baffles disposed within the primary baffles in spaced relationship with them and with each other, each baffle in similar position respecting the openings in the chamber and the primary baffles, heat radiating means disposed between these baffles in spaced relation, the upper group of baffles acting as diffusers, the lower group acting as concentrators, conduits removably secured to the openings in the chamber permitting the passing of air into and from the chamber.

2. In a device of the class described, in an apparatus for extracting moisture from the air, a condensing chamber having a plurality of vertically extending tubes in spaced relationship with dividing walls disposed therebetween, U shaped tube connections removably secured to the upper and lower ends of the tubes, packing means associated therewith, wiping means for the tubes comprising a plurality of vertically extending bars having associated with each pair of bars a horizontally positioned group of wiping rings connected at the lower ends of the respective bars, the upper ends of such bars being attached to reciprocating means for imparting vertical movement to said bars.

FRANK BATTER.